United States Patent [19]
Huber

[11] Patent Number: 6,142,555
[45] Date of Patent: Nov. 7, 2000

[54] COLLAPSIBLE HARD TOP FOR A CONVERTIBLE MOTOR VEHICLE

[75] Inventor: Helmut Huber, Niederalteich, Germany

[73] Assignee: EDSCHA Cabrio-Verdecksysteme GmbH, Hengersberg, Germany

[21] Appl. No.: 09/270,627

[22] Filed: Mar. 17, 1999

[30] Foreign Application Priority Data

Mar. 17, 1998 [DE] Germany .................. 198 11 481

[51] Int. Cl.$^7$ .................................................. B60J 7/14
[52] U.S. Cl. ................ 296/107.17; 296/107.07; 296/107.08
[58] Field of Search ............ 296/107.17, 107.16, 296/116, 117, 146.14, 107.07, 107.08

[56] References Cited

U.S. PATENT DOCUMENTS

| | | | |
|---|---|---|---|
| 3,536,354 | 10/1970 | Ingram | 296/107.17 X |
| 4,796,943 | 1/1989 | Fukutomi et al. | 296/107.17 X |
| 5,265,930 | 11/1993 | Klein et al. | 296/107.17 |
| 5,823,606 | 10/1998 | Schenk et al. | 296/107.08 |
| 5,967,591 | 10/1999 | Muehlhausen | 296/107.17 X |

FOREIGN PATENT DOCUMENTS

| | | | |
|---|---|---|---|
| 1475882 | 4/1967 | France . | |
| 002693956 | 1/1994 | France | 296/107.17 |
| 002696375 | 4/1994 | France | 296/107.17 |

OTHER PUBLICATIONS

"Steel Top Disappears" Automotive Industries, 1953, vol. 108, No. 10, p. 17.

Primary Examiner—Joseph D. Pape
Attorney, Agent, or Firm—Brown & Wood, LLP

[57] ABSTRACT

A collapsible hard top for convertible motor vehicle and including a rigid top panel displaceable between a closed position in which it overlaps an entire passenger compartment of the vehicle, and an open rearward position, and a rear window a position of which is independent of a position of the hard top and which pivots between an upright position, in which the rear window extends upward of motor vehicle body contour, and lowered position in which the rear window projects in to the passenger compartment, with a distance between a back side of rear posts of the top panel and a B-pillar of the vehicle body corresponding at least to a height of the hard top.

11 Claims, 4 Drawing Sheets

COLLAPSIBLE HARD TOP FOR A CONVERTIBLE MOTOR VEHICLE

BACKGROUND OF THE INVENTION

1. Field of the Invention

The present invention relates to a collapsible hard top for a convertible motor vehicle and including a rigid top panel displaceable between a closed position, in which it overlaps an entire passenger compartment of the vehicle, and an open rearward position, and a rear window, position of which is independent of a position of the hard top and which pivots between an upright position, in which the rear window extends upward of the motor vehicle body contour, and a lowered position in which the rear window projects into the passenger compartment.

2. Description of the Prior Art

Collapsible hard tops for convertibles, a rigid top panel of which is retracted from a position in which the top overlaps the passenger compartment of the vehicle, into a trunk arranged behind the passenger compartment, are known. In most known constructions of such collapsible hard tops, the top panel is supported for a longitudinal displacement, at least by its rear posts, on support and guide rails provided inside the vehicle. This naturally results in significant manufacturing costs and requires expensive control means. In addition, most known constructions of collapsible hard tops, which are retracted into trunks of the vehicle, substantially reduce the use area of the trunks, particularly in their stow position.

In a modified embodiment of a collapsible hard top for convertible, the rigid hard top lies, in its retracted position with the passenger compartment being exposed, on the trunk lid. A common feature of such collapsible hard tops consists in that even if the rear window can be pivoted into a downward retracted position, an operation of a vehicle with a partially open top is neither contemplated nor is possible. Furthermore, with a top panel lying on the trunk lid, a serious problem exists concerning rattle-free positioning of the top panel at high speeds.

Further, there are known collapsible hard tops in which, with a purpose of providing a compact structure of the top panel, the rear window is retracted under the rear region of the top panel. To this end, the rear window pivots about an axis extending in the lower end region of the rear top posts. However, even this hard top does not provide for a noticeable increase of the use space of a trunk.

Accordingly, an object of the present invention is to provide a collapsible hard top for convertible motor vehicles which would permit attachment of the collapsible hard top to a vehicle body with constructionally simple means, while insuring an easy retraction of the hard top from its closed position into its open position.

Another object of the present invention is to provide a collapsible hard top which would permit to increase the useful space of the trunk in a completely retracted position of the hard top.

A further object of the present invention is a collapsible hard top which would provide for operation of a convertible with a partially open hard top.

SUMMARY OF THE INVENTION

These and other objects of the present invention, which will become apparent hereinafter, are achieved by providing a hard top with which a distance between back sides of rear posts and a B-pillar of the motor vehicle body corresponds at least to the height of the hard top, with the trunk lid being secured in the vehicle body at least in the region of the B-pillar. This arrangement became possible with a cut-out of the front edge region of the trunk lid or with the entire trunk lid having a shape which permits to retract the rigid hard top into the trunk space beneath the trunk lid after it has been pivoted into its open position. With the trunk lid having been pivoted into an open position, the hard top can be retracted into the trunk by a simple movement. This insures an easy handling of the hard top and a simple economical construction of the support and displacement mechanism of the hard top, together with a space-saving positioning of the hard top in the trunk.

In a particularly advantageous embodiment of the present invention, it is contemplated that the rear window pivots, independently of the top panel, from its upright position to its lowered, folding position by pivoting forward about an axis extending in a region of its lower edge. The advantage of this arrangement consists in that the rear window need not be retracted, together with the top panel into the trunk, and therefore, even with the top panel being retracted into the trunk, a major faraway portion of the trunk frame remains accessible through the rear window cut-out formed in the top panel.

According to the invention, the trunk lid and the top panel are so attached to the vehicle body that they pivot in opposite directions, with the rear window being attached to the vehicle body so that it pivots in the same direction as the trunk lid.

In a further preferred embodiment of the present invention, the top panel, together with the rear top posts which are formed integrally with the top panel, is attached to the vehicle body by two pairs of swivelling levers the attachment points of which to the vehicle body are spaced in a longitudinal direction of the vehicle. The pairs of swivelling levers provide for lowering of the top panel into the trunk by pivotal and translatory movement of the top panel. The two pairs of swivelling levers, which are provided on opposite sides from the mid point of the vehicle, form, respectively, articulated parallelograms which provide for a displacement trajectory during the opening and closing movement that deviates from a pure circular trajectory.

The foregoing arrangement permits, on one hand, a simple attachment of the end surface of the top panel to the windshield frame and, on the other hand, an absolutely stable support of the rear region of the top panel in its closed position.

According to a further development of the present invention, the front swivelling lever of each of the respective swivelling lever pair is attached to the top panel at its top region, and has an angular shape, with its upper portion forming a middle top post which forms essentially, an extension of the B-pillar of the vehicle body.

According to a still further development of the present invention, the front swivelling levers are connected by a stirrup-region, which spans the width of the vehicle body, forming a rollover bar.

To enable operation of the convertible with a partially open top, it is advantageously provided that the rear window is attached to the vehicle body so that it pivots forward about an axis extending along the lower edge of the rear window to arrive at its lowered, folded position. This attachment of the rear window not only permits to use the vehicle with a partially open top but also provides a further advantage which consists in that the rear window abuts, in its closed position, the surrounding edge of the top panel or the edge of the rear window cut-out formed in the top panel from inside, which, in turn, permits to use simple sealing means for obtaining a reliably functioning sealing of the rear window.

According to a further preferred embodiment of the present invention, the rear side regions of the vehicle are formed as triangular windows fixedly connected with the rear window. Here, the rear window can be received in a frame to which the frames for the triangular windows can be connected at an appropriate angle. This enables not only a complete freedom of movement of the rear region of the vehicle top during operation of the vehicle with a partially open top, but also a particularly simple and space-saving stowing of the rigid top panel in the vehicle trunk. In addition, the need in a special drive for the side windows is advantageously eliminated, and space-saving stowing of the side windows is obtained when the top is completely open.

Advantageously, the rear window, together with the formed integrally therewith side windows, is attached to a vehicle body cross-bar which, in the closed position of the top, is located beneath the lower edge of the rear window. This attachment of the rear window permits to use relatively simple hinge means for attachment of the rear window. On the other hand, this attachment permits to cover the rear window, in its lower folded position, e.g., with a cover or a tarpaulin.

In a particularly advantageous embodiment of the present invention, the cross-bar, to which the rear window is attached, can be so arranged so that the cross-bar can be lowered. This expands the possibilities of designing differently shaped convertible having a collapsible top according to the present invention. Thus, in some convertible with the collapsible hard top according to the present invention, the front region of the top panel, in a retracted stow position of the top panel, can overlaps the rear window when the rear window is in its lowered position.

BRIEF DESCRIPTION OF THE DRAWINGS

The features and objects of the present invention will become more apparent, and the invention itself will be the best understood from the following detailed description for the preferred embodiments when read with reference to the accompanying drawings, wherein.

DETAILED DESCRIPTION OF THE PREFERRED EMBODIMENTS

Figure 1:
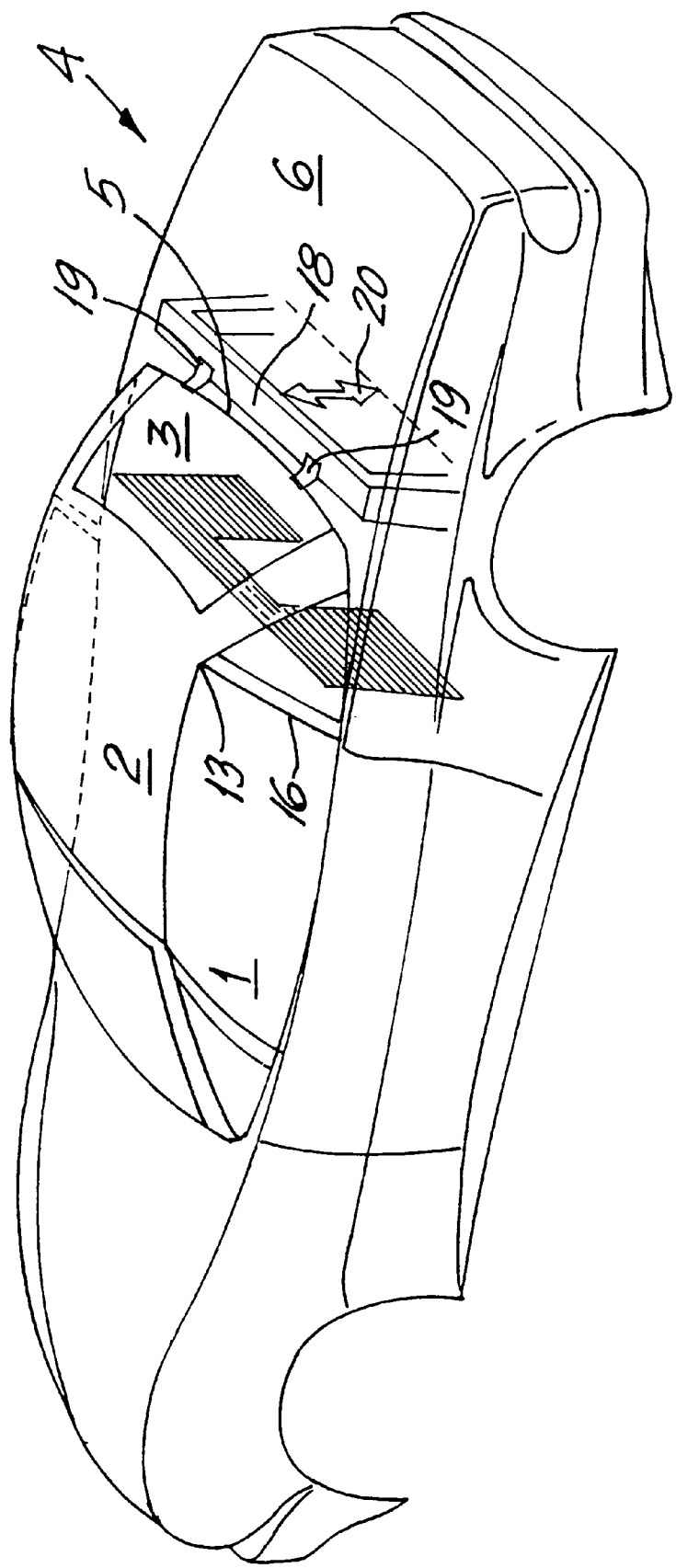
FIG. 1 shows a perspective view of a convertible with a collapsible hard top according to the present invention, with the top being in a completely closed position.

A collapsible hard top according to the present invention, which is shown in the drawings, includes essentially a rigid top panel 2, which overlaps the entire passenger compartment 1 and is completely retractable into a trunk 4 of the vehicle, and a rear window 3 the position of which is adjustable independently of the position of the top panel 2.

Figure 3:
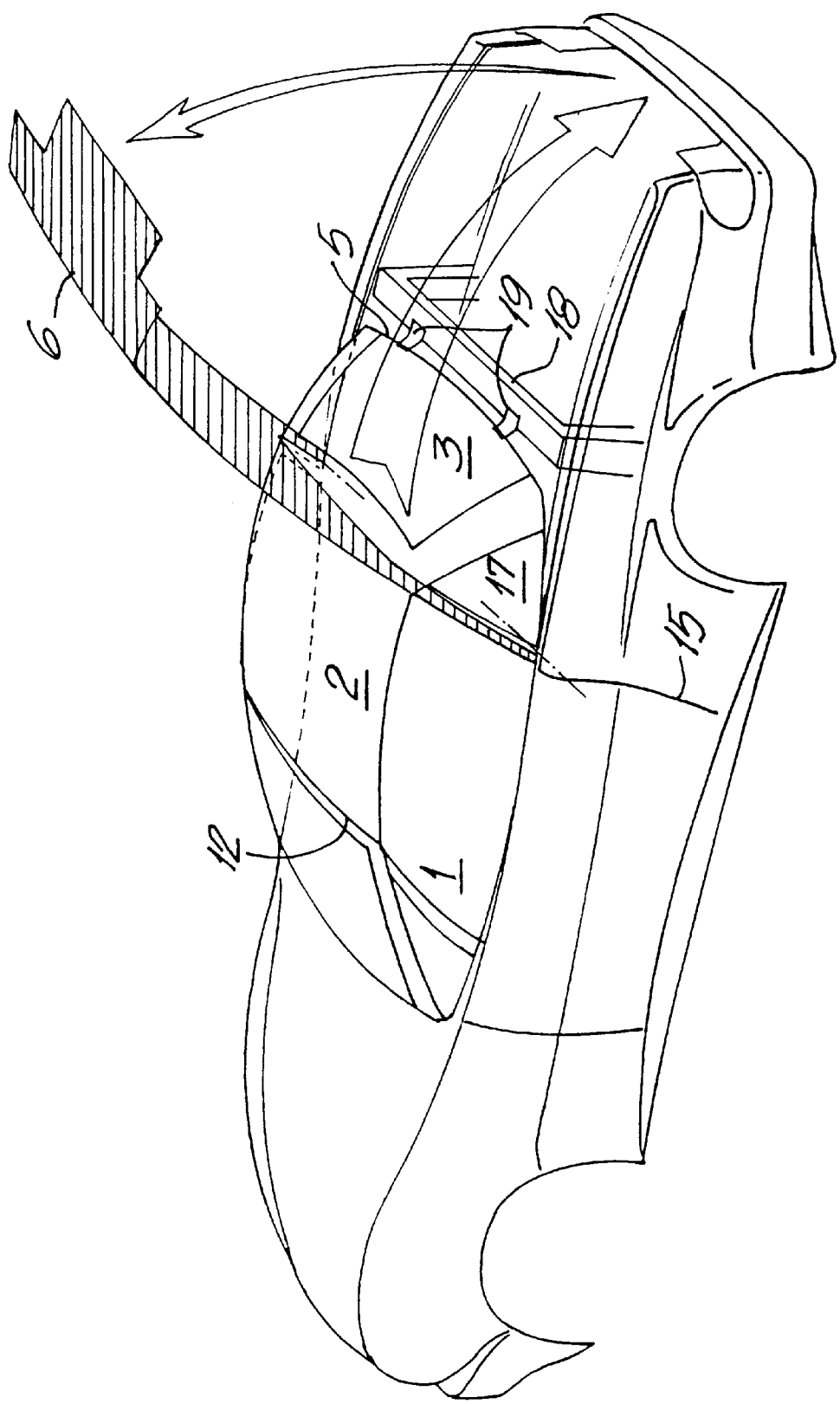
FIG. 3 shows a perspective view of a convertible with a collapsible hard top according to the present invention, with the top being in a completely closed position and the rear window being in a completely open position.
Figure 4:
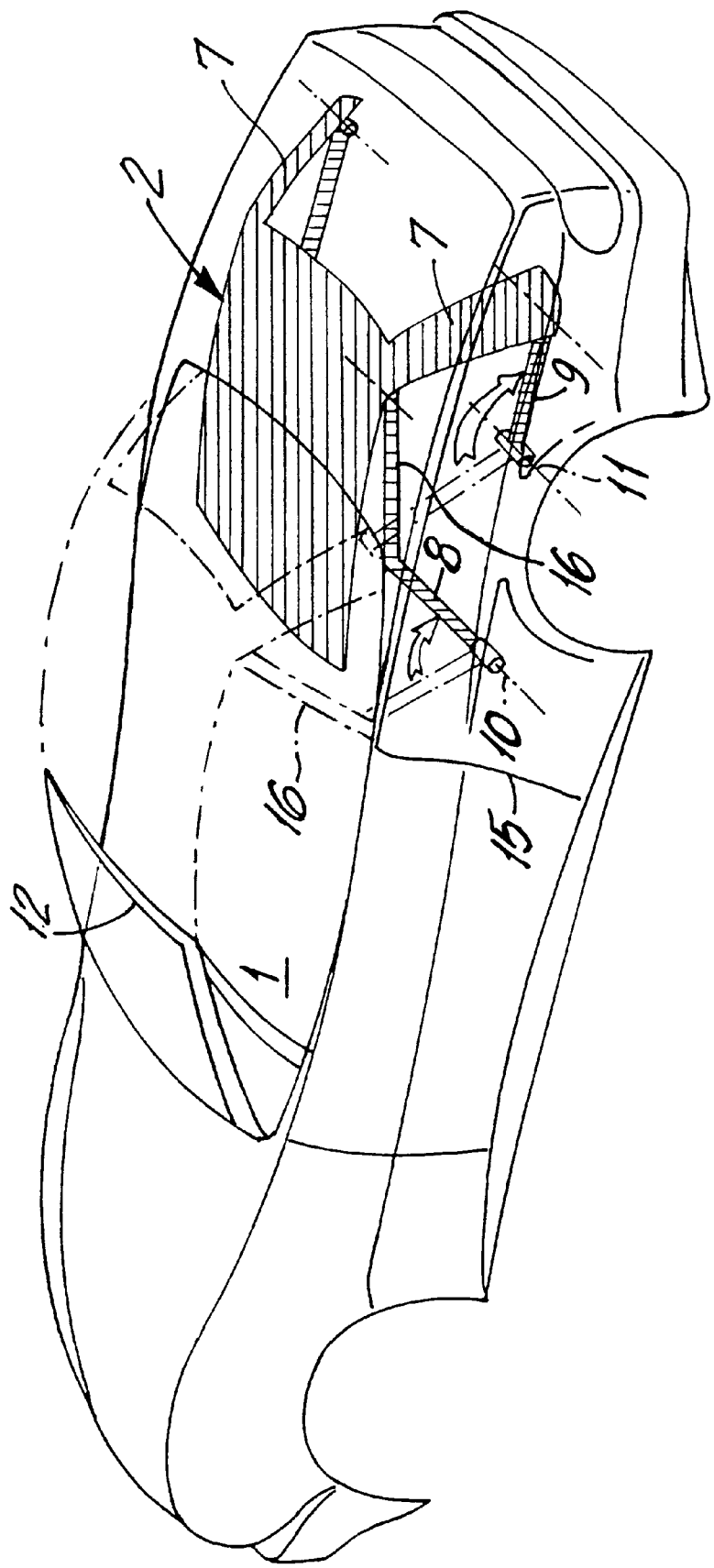
FIG. 4 shows a perspective view of a convertible with a collapsible hard top according to the present invention, with the top being in a completely open position.

The rear window 3 can be folded independently of the top panel 2 by being pivoted in a forward direction about an axis extending in the region of its lower edge 5. The top panel 2 and the trunk lid 6 are attached to the vehicle body with a possibility of a pivotal movement in opposite directions. The top panel 2, together with the rear top posts 7 which are formed integrally with the top panel 2, is attached to the vehicle body by two pairs 8 and 9 of swivelling levers the attachment points 10 and 11 of which to the vehicle body in the closed position of the hard top. In the closed position, the back side of the rear posts 7 is spaced from the B-pillar by a distance substantially equal at least to the height of the hard top. The trunk lid 6 in this embodiment is secured to the B-pillar 15, as shown in FIG. 3 are spaced in a longitudinal direction of the vehicle. The pairs of swivelling levers 8 and 9 provide for lowering of the top panel 2 into the trunk 4 by pivotal and translatory movement of the top panel 2. The two pairs 8 and 9 of swivelling levers, which are provided on opposite sides from the mid point of the vehicle, form, respectively, articulated parallelograms which provide, as particularly shown in FIG. 4, for a displacement trajectory during the opening and closing movement of the top that deviates from a pure circular trajectory. The end side of the top panel 2 is secured to a windshield frame 12 in an appropriate manner, not shown in detail in the drawings. On the other hand, the swivelling lever pairs 8, 9 provide for a completely stable support of the rear region of the top panel 2 in the closed position of the top. The front swivelling lever 8 of each of the respective swivelling lever pair 8, 9 is attached to the top panel 2 at its top region 13. The swivelling lever 8 has an angular shape, with its upper portion 16 forming a middle top post which forms an extension of the B-pillar 15 of the vehicle body.

Figure 2:
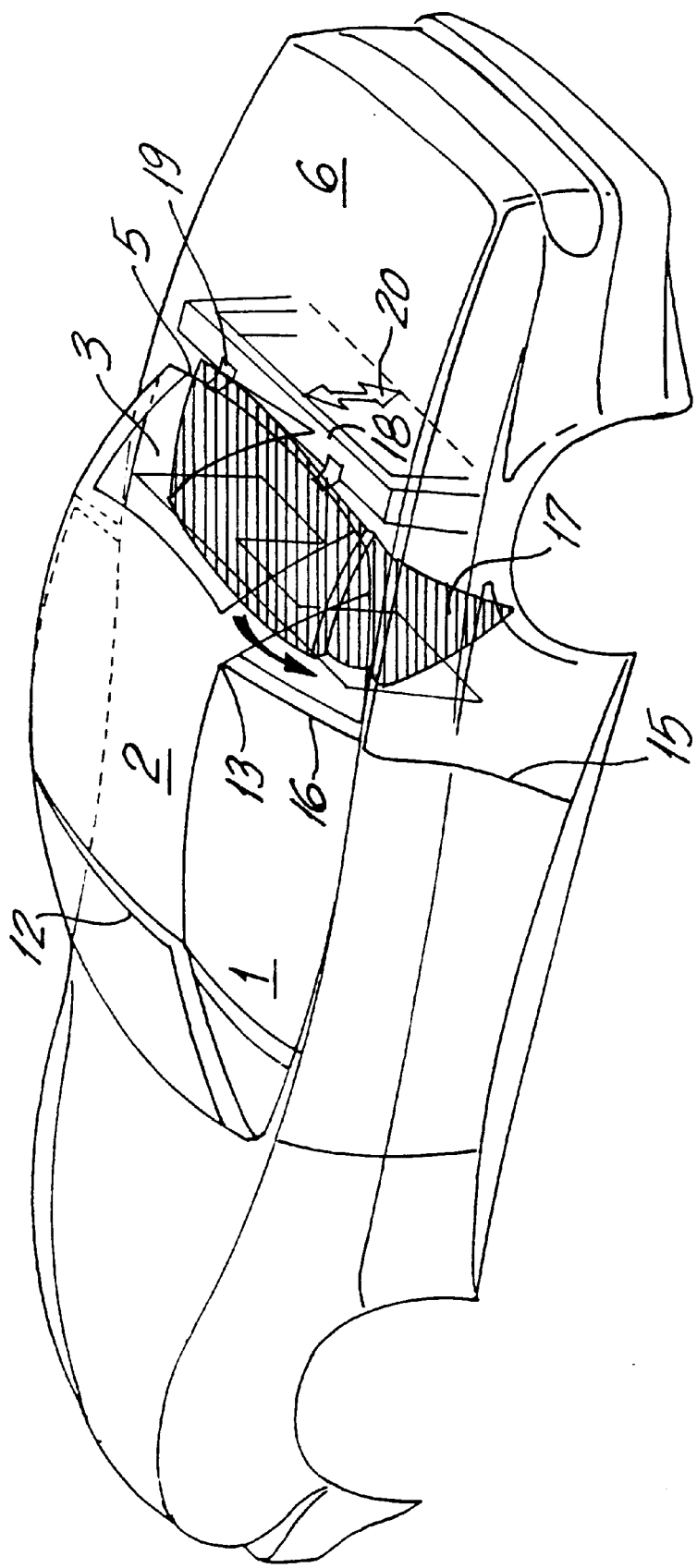
FIG. 2 shows a perspective view of a convertible with a collapsible hard top according to the present invention, with the rear window being in an open position.

In its closed position, the rear window 3 occupies the rear window cut-out in the top panel 2. The rear side window regions 17 of the vehicle are formed as triangular windows fixedly connected with the rear window 3. The rear window 3, together with the side window regions 17, is attached to the vehicle body cross-member 18 at its lower, in the closed position of the top, edge 5. The rear window 3 is attached to the cross-member 18 with hinges 19. As shown in FIGS. 1 and 2 with an arrow 20, the body cross-member 18, which support the rear window 3, can be so arranged that it can be lowered.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A convertible motor vehicle, comprising:
   a body having a B-pillar and defining a passenger compartment and a trunk;
   a trunk lid secured to the vehicle body at least in a region of the B-pillar; and
   a collapsible hard top having:
      a rigid top panel including rear posts;
      means for securing the top panel to the vehicle body and for pivoting the top panel between a closed position in which the top panel overlaps the passenger compartment entirely, and an open rearward position, and
      a rear window a position of which is independent of the position of the top panel and which pivots between an upright position in which the rear window is located above the vehicle body, and a lowered position in which the rear window extends into the passenger compartment, wherein in the closed position of the top panel, a distance between a back side of the rear posts of the top panel and the B-pillar corresponds at least to a height of the hard top, and the trunk lid encompasses a rear region of the top panel.

2. A motor vehicle as set forth in claim 1, wherein the rear window pivots, independently of the top panel, form the upright position thereof to the lowered position thereof by pivoting forward about an axis extending in a region of a lower edge thereof.

3. A motor vehicle as set forth in claim 1, wherein the hard top pivots in a direction opposite to a pivot direction of a trunk lid which is attached to the motor vehicle body at least in a region of the B-pillar.

4. A motor vehicle as set forth in claim 1, wherein the top panel, which is formed integrally with the rear posts thereof, is stowed in a vehicle trunk in a completely open position of the hard top, and wherein the securing and pivoting means further comprises two swivelling lever pairs, attachment points of which are spaced from each other in a longitudinal direction of the vehicle, providing for pivotal and translatory movement of the top panel, together with the rear posts, during the displacement of the top panel between the closed and open positions of the hard top.

5. A motor vehicle as set forth in claim 1, wherein rear side window regions are formed as triangular windows rigidly connected with the rear window.

6. A motor vehicle as set forth in claim 5, wherein the top panel and the rear window, which is formed integrally with the side window regions, are attached to the vehicle body for pivotal movement in the same direction about respective axis extending parallel to each other.

7. A motor vehicle as set forth in claim 1, wherein a front region of the top panel, in a retracted stow position of the top panel, overlaps the rear window when the rear window is in the lowered position thereof.

8. A convertible motor vehicle, comprising:
a body with a B-pillar and defining a passenger compartment and a trunk;
a trunk lid secured to the vehicle body at least in a region of the B-pillar; and
a collapsible hard top having:
a rigid top panel including rear posts;
means for securing the top panel to the vehicle body and for pivoting the top panel between a closed position in which the top panel overlaps the passenger compartment entirely, and an open rearward position, and
a rear window a petition of which is independent of the position of the top panel and which pivots between an upright position in which the rear window is located above the vehicle body, and a lowered position in which the rear window extends into the passenger compartment,
wherein in the closed position of the top panel, a distance between a back side of the rear posts of the top panel and the B-pillar corresponds at least to a height of the hard top, and the trunk lid encompasses a rear region of the top panel,
wherein rear side window regions are formed as triangular windows rigidly connected with the rear window, and
wherein the rear window, which is formed integrally with the rear side window regions, is attached, in a middle region thereof, to a vehicle body cross-bar with hinge means attached to a lower edge of the rear window.

9. A motor vehicle as set forth in claim 8, wherein the cross-bar is lowerable.

10. A convertible motor vehicle, comprising:
a body with a B-pillar and defining a passenger compartment and a trunk;
a trunk lid secured to the vehicle body at least in a region of the B-pillar; and
a collapsible hard top having:
a rigid top panel including rear posts;
means for securing the top panel to the vehicle body and for pivoting the top panel between a closed position in which the top panel entirely overlaps the passenger compartment, and an open rearward position, and
a rear window a position of which is independent of the position of the top panel and which pivots between an upright position in which the rear window is located above the vehicle body, and a lowered position in which the rear window extends into the passenger compartment,
wherein in the closed position of the top panel, a distance between a back side of the rear posts of the top panel and the B-pillar corresponds at least to a height of the hard top, and the trunk lid encompasses a rear region of the top panel,
wherein the top panel, is formed integrally with the rear posts thereof and is stowed in a vehicle trunk in a completely open position of the hard top, and
wherein the securing and pivoting means comprises two swivelling lever pairs attachment points of which are spaced from each other in a longitudinal direction of the vehicle and which provide for pivotal and translatory movement of the top panel, together with the rear posts, during the displacement of the top panel between the closed and open position of the hard top, front swivelling levers of respective swivelling lever pairs having an angular shape, with upper regions of the front swivelling levers forming middle top posts.

11. A convertible motor vehicle, comprising:
a body with a B-pillar and defining a passenger compartment and a trunk;
a trunk lid secured to the vehicle body at least in a region of the B-pillar; and
a collapsible hard top having:
a rigid top panel including rear posts;
means for securing the top panel to the vehicle body and for pivoting the top panel between a closed position in which the top panel overlaps the passenger compartment entirely, and an open rearward position, and
a rear window a position of which is independent of the position of the top panel and which pivots between an upright position in which the rear window is located above the vehicle body, and a lowered position in which the rear window extends into the passenger compartment,
wherein in the closed position of the top panel, a distance between a backside of the rear posts of the top panel and the B-pillar corresponds at least to a height of the hard top,
wherein the top panel is formed integrally with the rear posts thereof and is stowed in a vehicle trunk in a completely open position of the hard top, and wherein the securing and pivoting means comprises two swivelling lever pairs attachment points of which are spaced from each other in a longitudinal direction of the vehicle and which provide for pivotal and translatory movement of the top panel, together with the rear posts, during the displacement of the top panel between the closed and open position of the hard top, front swivelling levers of respective swivelling lever pairs having an angular shape, with upper regions of the front swivelling levers forming middle top posts.

* * * * *